United States Patent [19]

Ichikawa

[11] Patent Number: 6,100,980
[45] Date of Patent: Aug. 8, 2000

[54] MAGNIFICATION CALIBRATION APPARATUS AND SHAPE MEASURING SYSTEM

[75] Inventor: Hajime Ichikawa, Yokohama, Japan

[73] Assignee: Nikon Corporation, Tokyo, Japan

[21] Appl. No.: 09/054,450

[22] Filed: Apr. 3, 1998

[30]    Foreign Application Priority Data

Apr. 4, 1997 [JP] Japan ..................... 9-086735

[51] Int. Cl.⁷ .................................................. G01B 9/02
[52] U.S. Cl. .......................................... 356/359; 356/363
[58] Field of Search .................... 356/356, 359, 356/360, 358, 363, 345

[56]         References Cited

U.S. PATENT DOCUMENTS 5,838,442  11/1998  Bray ......................................... 356/359

*Primary Examiner*—Robert H. Kim
*Assistant Examiner*—Andrew H. Lee
*Attorney, Agent, or Firm*—Morgan, Lewis & Bockius LLP

[57]          ABSTRACT

A magnification calibration apparatus includes an optical system optically coupled to an object surface for forming an image of the object surface, a detector for detecting the image of the object surface, and a movable support for supporting the object surface, the movable support being capable of laterally moving the object surface by a predetermined distance from a first lateral position to a second lateral position. The magnification calibration apparatus further includes a reference point recognition unit for, at each of the first and second lateral positions of the object surface, detecting the position of the image of an imaginary reference point on the object surface as a position in a detector coordinate system fixed to the detector in accordance with the image detected by the detector, and a computation unit for deriving a correspondence between an object coordinate system at the object surface and the detector coordinate system from the detected positions of the image in the detector coordinate system at the first and second lateral positions of the object surface and from the predetermined distance by which the object surface is moved from the first lateral position to the second lateral position by the movable support.

9 Claims, 2 Drawing Sheets

MAGNIFICATION CALIBRATION APPARATUS AND SHAPE MEASURING SYSTEM

This application claims the benefit of Japanese Application No. 09-086735, filed in Japan on Apr. 4, 1997, which is hereby incorporated by reference.

BACKGROUND OF THE INVENTION

1. Field of the Invention

The present invention relates to a magnification calibration apparatus and a shape measurement system, and more particularly, to a magnification calibration apparatus and a shape measurement system that can calibrate the magnification of an interference optical system for interference measurements.

2. Discussion of the Related Art

In interference measurements, diffraction or the like causes fictitious rises (edges) at the peripheral of a 3D graphic representation of an object surface (a graphic representation in which the shape of the object surface is expressed in three dimensions), which is obtained by analytic means, such as a fringe scan. Therefore, the resultant data do not faithfully indicate the surface profile of object surface. Accordingly, a so-called edge removing function has been used to correct this error.

Furthermore, depending on the reflectivity of the object surface, the strength of the brightness signal from the interference fringes may become insufficient as a result of mis-match between the light reflected from reference surface of the interferometer and the light reflected from the object surface. In order to cope with such variations in the brightness signal, a function is provided for automatically adjusting the gain of the interference fringe image pickup device.

However, if the significant edge effects occur or surfaces with different reflectivities are measured, the effective area of the object surface that is detected by the interference fringe image pickup device varies from object surface to object surface, even if the actual diameters of the object surfaces are the same. Accordingly, when discrete intervals, at which the profile of the object surface is sampled by the interference fringe image pickup device, are set with reference to the outer diameter as a standard, undesirable errors may be generated.

SUMMARY OF THE INVENTION

Accordingly, the present invention is directed to a magnification calibration apparatus and a shape measuring system that substantially obviate the problems due to limitations and disadvantages of the related art.

An object of the present invention is to provide a magnification calibration apparatus and a shape measuring system that are capable of measuring the discrete intervals at which the profile of the object surface is sampled.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides, according to a first aspect, a magnification calibration apparatus including an optical system for focusing the image of an object surface; detection means for detecting the focused object surface at discrete coordinate points; reference point position recognition means for recognizing the position of a reference point set on the object surface as a position in the coordinates of the detection means on the basis of information obtained from the detection means; moving means for moving the object surface by a predetermined distance; and calculating means for calculating the correspondence between the coordinates on the object surface and the coordinates of the detection means on the basis of a comparison of the amount of movement of the reference point on the coordinates of the detection means obtained by the reference point position recognition means when the above-mentioned object surface is moved by the moving means, with the known amount of movement performed by the moving means.

In a second aspect, the present invention provides the magnification calibration apparatus as described in the first aspect above, wherein the reference point position recognition means includes rotating means for rotating the object surface in a direction that contains a directional component about the optical axis of the optical system; and averaging means for averaging information obtained at a plurality of rotational angles by the detection means when the object surface is caused to rotate by the rotating means, wherein the center of the rotation of the object surface caused by the rotating means is recognized as the reference point on the basis of information indicating the rotationally symmetric component of the object surface obtained by the averaging means.

In a third aspect, the present invention provides the magnification calibration apparatus as described in the first aspect of the present invention, wherein the reference point position recognition means recognizes as the reference point a point that can be geometrically defined from the outline shape of the object surface obtained on the basis of information from the detection means.

In a fourth aspect, the present invention provides the magnification calibration apparatus as described in the third aspect above, wherein the external shape of the object surface is specified by adding a weighting coefficient to the information that provides the outline portion of the image of the object surface among the information obtained by the detection means.

In a fifth aspect, the present invention provides the magnification calibration apparatus as described in any one of the first to fourth aspects above, wherein when the image is subjected to a lateral coordinate distortion caused by distortion of the optical system or geometrical distortion accompanying the movement of the object surface, a correction is made to the information obtained by the detection means to eliminate the lateral coordinate distortion.

In a sixth aspect, the present invention provides a shape measuring system including the magnification calibration apparatus as described in any one of the first to fifth aspects above; and interference fringe image pickup means for imaging interference fringes corresponding to the shape of the object surface, wherein the gain that determines the image pickup area of the object surface is variable, and wherein the gain of the interference fringe image pickup means is adjusted on the basis of the correspondence between the calculated coordinates on the object surface and the coordinates of the detection means.

In a seventh aspect, the present invention provides a shape measuring system including the magnification calibration apparatus as described in the third aspect above; and an interference fringe image pickup means for imaging interference fringes corresponding to the shape of the object surface.

In another aspect, the present invention provides a magnification calibration apparatus, including an optical system optically coupled to an object surface for forming an image of the object surface; a detector for detecting the image of the object surface; a movable support for supporting the object surface, the movable support being capable of laterally moving the object surface by a predetermined distance from a first lateral position to a second lateral position; a reference point recognition unit for, at each of the first and second lateral positions of the object surface, detecting the position of the image of an imaginary reference point on the object surface as a position in a detector coordinate system fixed to the detector in accordance with the image detected by the detector; and a computation unit for deriving a correspondence between an object coordinate system at the object surface and the detector coordinate system from the detected positions of the image in the detector coordinate system at the first and second lateral positions of the object surface and from the predetermined distance by which the object surface is moved from the first lateral position to the second lateral position by the movable support.

In another aspect, the present invention provides a surface profile measuring system, including an interference optical system for generating interference fringes by interference between light from an object surface and light from a reference surface, the interference fringes representing a surface profile of the object surface relative to the reference surface; a detector for detecting the interference fringes to output data indicating the surface profile of the object surface; a movable support for supporting the object surface, the movable support being capable of laterally moving the object surface by a predetermined distance from a first lateral position to a second lateral position; a reference point recognition unit for, at each of the first and second lateral positions of the object surface, recognizing and detecting the position of an imaginary reference point on the object surface as a position in a detector coordinate system fixed to the detector in accordance with the data outputted from the detector; and a computation unit for deriving a correspondence between an object coordinate system at the object surface and the detector coordinate system at the detector from the detected positions of the imaginary reference point at the first and second lateral positions of the object surface and from the predetermined distance by which the object surface is moved from the first lateral position to the second lateral position by the movable support.

In another aspect, the present invention provides a surface profile measuring system, including an interference optical system for generating interference fringes between light from an object surface and light from a reference surface, the interference fringes representing a surface profile of the object surface relative to the reference surface; a detector for detecting the interference fringes to output data representing the surface profile of the object surface; a movable support for supporting the object surface, the movable support being capable of laterally moving the object surface by a predetermined distance from a first lateral position to a second lateral position; a reference point recognition unit for, at each of the first and second lateral positions of the object surface, recognizing and detecting the position of an imaginary reference point fixed to the object surface as a position in a coordinate system at the detector in accordance with the data outputted from the detector; and a computation unit for deriving a correspondence between a coordinate system at the object surface and the coordinate system at the detector in accordance with the detected positions of the imaginary reference point at the first and second lateral positions of the object surface and the predetermined distance by which the object surface is moved from the first lateral position to the second lateral position by the movable support, wherein the reference point recognition unit adds a weighing coefficient to the data corresponding to an area adjacent an outer edge of the object surface in accordance with the derived correspondence between the coordinate system at the object surface and the coordinate system at the detector to derive an accurate shape of the outer edge of the object surface.

In another aspect, the present invention provides an interferometric apparatus for measuring a surface profile of an object surface relative to a reference surface, including an interference optical system optically coupled to the object surface and to the reference surface to form interference fringes on a predetermined plane with a predetermined projection ratio, the interference fringes indicating the surface profile of the object surface relative to the reference surface; a detector disposed at the predetermined plane of the interference optical system for outputting signals indicating the interference fringes formed on the predetermined plane; a movable stage for supporting the object surface, the movable stage being capable of moving the object surface by a predetermined distance from a first lateral position to a second lateral position while maintaining the predetermined projection ratio with respect to the resultant interference fringes; and a processing unit processing the signals outputted from the detector at the first and second lateral positions of the object surface to derive a position of an imaginary reference point on the object surface as a position in a detector coordinate system fixed to the detector at each of the first and second predetermined positions of the object surface, the processing unit further calibrating the predetermined projection ratio in accordance with the detected positions of the imaginary reference point on the object surface at the first and second lateral positions and the predetermined distance by which the object surface is moved from the first lateral position to the second lateral position to obtain a calibrated projection ratio.

In another aspect, the present invention provides a method of calibrating a projection ratio of an optical system projecting an image of an object surface onto an image plane, the method including the steps of positioning the object surface at a first predetermined position; detecting a projected position of an imaginary reference point on the object surface positioned at the first predetermined position in an image coordinate system fixed to the image plane; moving the object surface by a predetermined distance to a second predetermined position; detecting a projected position of the imaginary reference point on the object surface positioned at the second predetermined position in the image coordinate system; and calibrating the projection ratio in accordance with the detected positions of the imaginary reference point at the first and second predetermined positions of the object surface and the predetermined distance by which the object surface is moved in the step of moving.

In a further aspect, the present invention provides a method of calibrating a projection ratio of an optical system for forming an interference pattern by interference between light from the object surface and light from a reference surface of an object surface, the method including the steps of placing the object surface at a first predetermined position; identifying a position of an image of an imaginary reference point on the object surface within the interference pattern while the object surface is placed a the first predetermined position; moving the object surface by a predetermined distance to a second predetermined position; identifying a position of an image of the imaginary reference point on the object surface within the interference pattern while the object surface is placed at the second predetermined position; and calibrating the projection ratio in accordance with the identified positions of the imaginary reference point at the first and second predetermined positions of the object surface and the predetermined distance by which the object surface is moved in the step of moving.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1A shows a state prior to lateral shift, and FIG. 1B shows a state after the lateral shift;

DETAILED DESCRIPTION OF THE PREFERRED EMBODIMENTS

Reference will now be made in detail to the preferred embodiments of the present invention, examples of which are illustrated in the accompanying drawings.

Figure 1B:
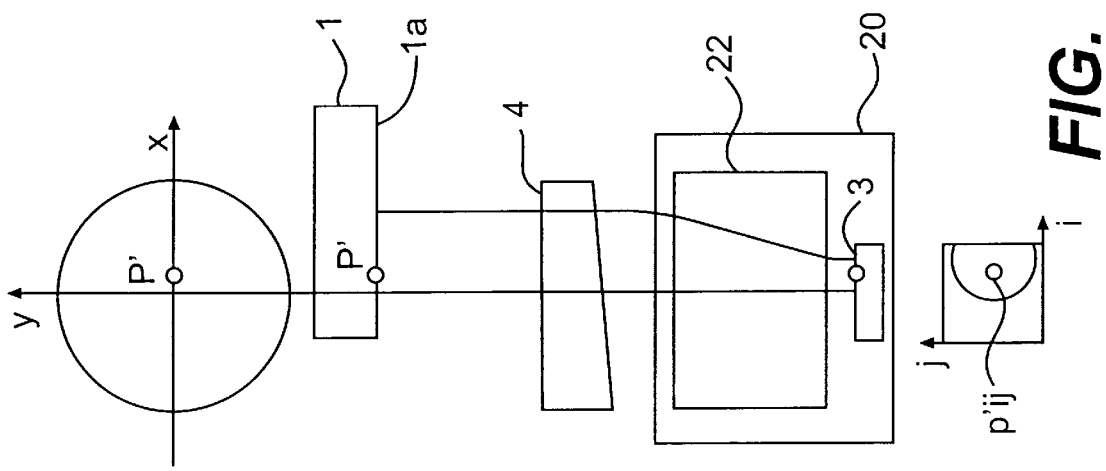
FIGS. 1A and 1B schematically illustrate the optical arrangement of a magnification calibration apparatus according to the present invention.
Figure 1A:
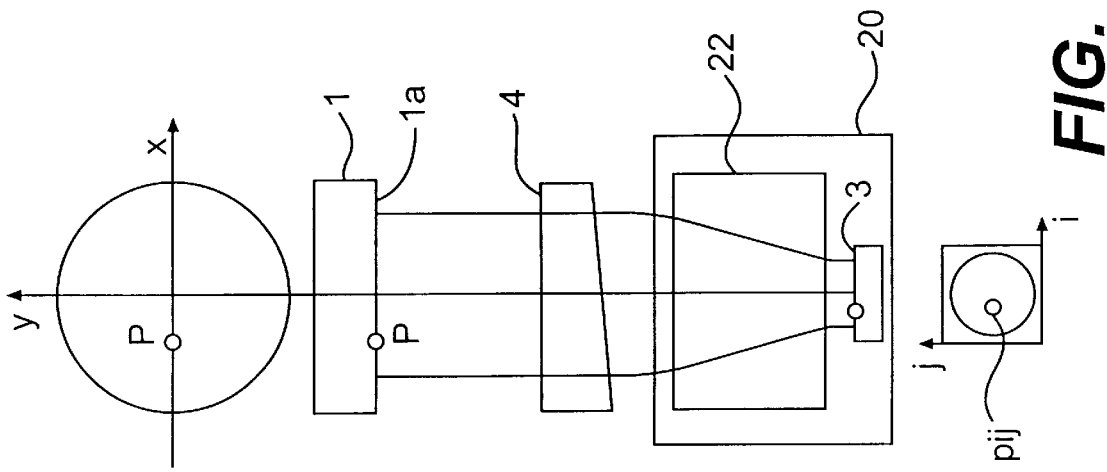

FIGS. 1A and 1B illustrate a measurement principle of the present invention. For simplicity, a case of a flat surface is illustrated. As shown in FIG. 1A, an imaginary point P is set in the (X, Y) coordinate system of an object surface 1a of an object of detection 1, and the address pij of the point P in (i,j) coordinate system is recognized by an interference fringe image pickup device 3 (CCD (charge coupled device) or the like) of an interferometer and is stored in a computation unit (not shown in FIGS. 1A and 1B: see FIG. 2 and the accompanying description below).

As shown in FIG. 1B, the object of detection 1 is laterally shifted by a predetermined vector quantity L that is perpendicular to the optical axis of measurement (this is limited to cases where the object surface 1a and a reference surface 4 are parallel) while maintaining the interference between the object surface 1a and the reference surface 4 of the interferometer 20 (since the figure illustrates an example in which a Fizeau interferometer is used, the reference surface 4 is located outside the main body 22 of the interferometer). As a result, the imaginary point P is also laterally shifted by a predetermined vector quantity L. As shown in FIG. 1B, this point is designated as P' in the (X, Y) coordinate system. Then, the address "p'ij" in the coordinate system (i,j), of the imaginary point P' is recognized by the interference fringe image pickup device 3 of the interferometer, and is stored in the above-mentioned computation unit.

The difference (p'ij-pij) between these two addresses is calculated in the computation unit, and lateral shift vector quantity L' corresponding to the shift of the imaginary point P on the interference fringe image pickup device 3 is thus determined. In this case, if there is no lateral coordinate distortion caused by the interference fringe image pickup device 3 or distortion in the coordinate correspondence between the image pickup device 3 and the object surface 1a, then |L|/|L'| expresses the magnification of the interferometer 20. If the interference fringe image pickup device 3 is a CCD, the unit used is "mm/pixel", and this value refers to the length per unit pixel interval on the XY coordinates of the projection of the object surface.

First Preferred Embodiment

Figure 2:
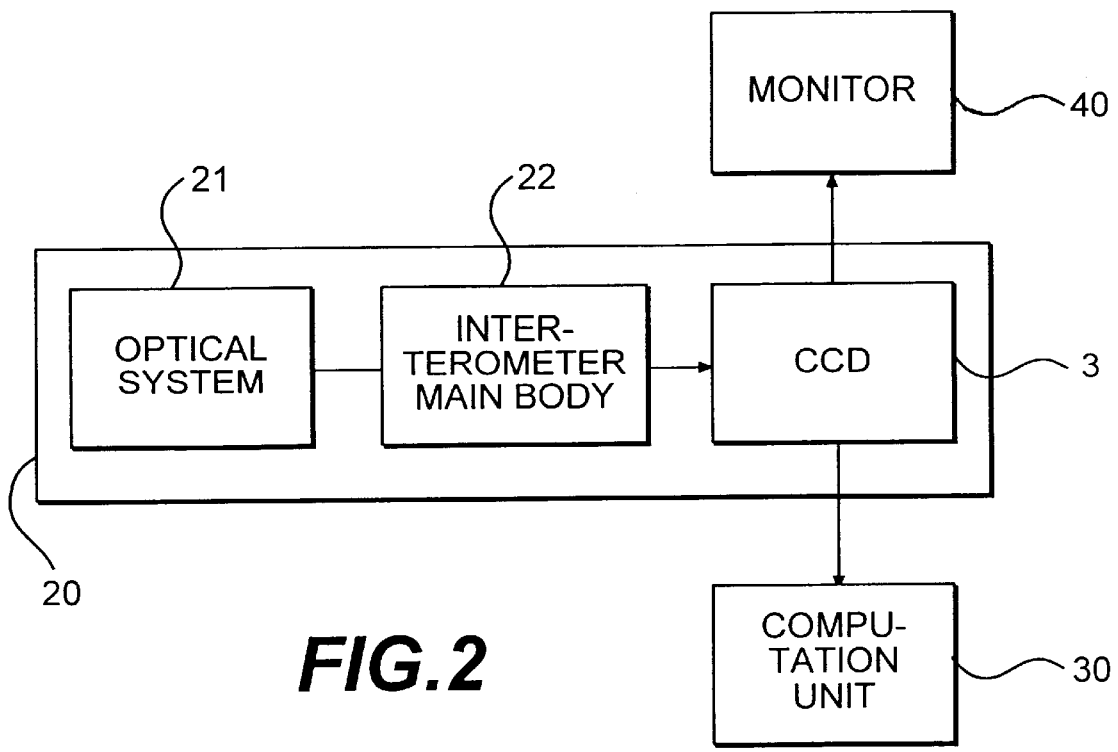
FIG. 2 is a block diagram schematically illustrating the construction of a magnification calibration apparatus according to a first preferred embodiment of the present invention.

FIG. 2 is a block diagram that illustrates the construction of a first preferred embodiment of the magnification calibration apparatus. This first preferred embodiment of the magnification calibration apparatus is equipped with an interferometer 20 that has an optical system 21, an interferometer main body 22, and a CCD camera (interference image pickup device) 3, a computation unit (computer) 30, and a monitor 40.

The optical system 21 causes interference between light reflected from the object surface 1a and light reflected from the Fizeau surface 4 (a reference surface), and thus forms interference fringes at the interferometer main body 22. The interferometer main body 22 contains a light source generating light that can cause interference, a beam expander, and a beam splitter, etc. (none of which is shown in the figures), and focuses the interference fringes formed by the optical system 21 onto a CCD camera 3. The CCD camera 3 captures the image of the interference fringes thus produced, and sends the image information to the computation unit 30 and monitor 40.

The computation unit 30 stores information concerning the object surface la beforehand, and calculates and stores coefficients required for various subsequent operations on measured data. The computation unit 30 also converts image information from the CCD camera 3 into light path difference information, processes such light path difference data on the basis of stored coefficients, calculates a shape error of the object surface 1a, and displays the measurement results. The monitor 40 is a display device for displaying the interference fringes, and is used during alignment of the object surface 1a.

Figure 3:
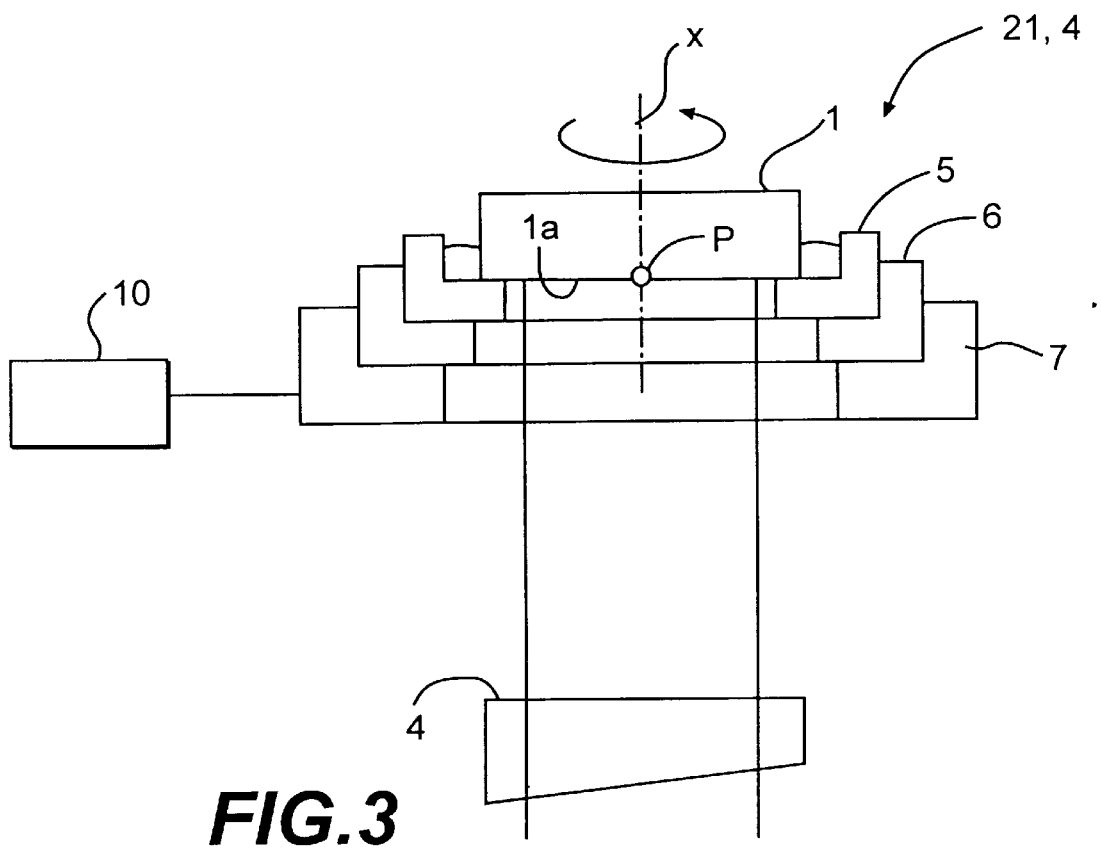
FIG. 3 is a diagram schematically illustrating the optical system of the first preferred embodiment of the present invention.

As shown in FIG. 3, the optical system 21 of the magnification calibrating device according to the first preferred embodiment is equipped with a holding/adjusting mechanism 5 for supporting the object of detection 1 and for aligning the object surface 1a, a rotating mechanism 6 rotatably supporting the holding/adjusting mechanism 5 so that the holding/adjusting mechanism 5 can rotate about the axis of rotation X, and a tilting mechanism 7 for supporting the rotating mechanism 6 and for adjusting the inclination of the axis of rotation X. If the axis of rotation X is adjusted to be perpendicular to the reference surface 4, thereby aligning the object surface 1a with the reference surface 4, then the interference fringes will remain as formed even if the object of detection 1 is rotated about the axis of rotation X. By this construction, even after the tilting mechanism 7 is moved by a predetermined distance in a direction substantially perpendicular to the axis of rotation X by means of the moving mechanism 10, the rotational averaging can be accomplished at each of the initial position and the terminal position of the object surface without any difficulty.

Known methods are used for converting image information from the CCD camera 3 into light path difference data with high accuracy, and for simply analyzing and processing the resulting light path difference data to obtain the surface profile of the object surface as a basis to which the present invention is applied. Accordingly, detailed descriptions of these techniques are omitted here.

An example in which an imaginary point is located on the object surface using the first preferred embodiment of the magnification calibrating device constructed above will be described with reference to FIG. 3. In this example, the interference measurement data are averaged by rotating the object surface 1a about the optical axis, so that the rotationally symmetric components of the surface profile of the object surface 1a are obtained and the center of such rotationally symmetric components is used as the imaginary point P.

Various methods can be used to obtain interference measurement data for such rotational averaging. For example, the object surface 1a may be discretely rotated by a fixed increment and the surface profile at each rotated position is measured. Then, the interference measurement data accumulated by rotating the object surface by an integral multiple of one revolution are summed and averaged in the computation unit 30. Alternatively, by utilizing the cumulative effect of the CCD camera 3, interference fringe data accumulated by rotating the object surface 1a by an integral multiple of one revolution may be added and averaged directly at the CCD camera 3.

As for a concrete alignment method that can be used to align the object surface 1a, the following procedure can be adapted, for example. First, the object surface 1a is aligned using the holding/adjusting mechanism 5 in a such a way as to minimize the number of the interference fringes formed by interference between the object surface 1a and the reference surface 4 without performing any alignment correction. Then, in this tentatively aligned condition, the object surface 1a is rotated by 180 degrees about the axis of rotation X, and alignment error correction is applied to the differential data representing the difference between the data at 0 degree and the data at 180 degrees. By taking into account that the alignment deviation obtained by this analysis is twice the tilt error between the axis of rotation X and the optical axis, the alignment deviation can be corrected by tilting the axis of rotation X of the rotating mechanism 6 by an appropriate angle through the tilt adjustment mechanism 7.

In any event, in order to improve the measurement accuracy in this example, it is essential that there is no axial fluctuation in the axis of rotation X of the rotating mechanism 6 for rotating the object surface 1a, and that the holding/adjusting mechanism 5 for holding the object of detection 1 with the object surface 1a has no play with respect to the object of detection 1 or with respect to rotating mechanism 6.

Furthermore, even in the cases where the interference fringe image pickup device 3 can hold image information only in a discrete manner, as in the case of a CCD camera, the accurate position of the axis of rotation X within the CCD pixels can be determined by the following procedures. Assuming that the axis of rotation X is laterally shifted by an unknown vector quantity (Sx, Sy) with respect to the origin (0, 0) of the coordinate system, the above-mentioned rotationally symmetric components can be expanded in terms of a polynomial to an appropriate order, as follows:

$$Z = C00 + C02\{(X-Sx)^2 + (Y-Sy)^2\}$$
$$+ C04\{(X-Sx)^2 + (Y-Sy)^2\}^2$$
$$+ C06\{(X-Sx)^2 + (Y-Sy)^2\}^4 + \ldots \quad \text{Equation (1)}$$

Then, optimal fitting can be performed on the rotationally averaged data using the least squares fitting method. In order to simplify the equations in the following description, up to C04 terms of the equation is used below.

In this least squares approach, using a total differential equation for infinitesimal increments, i.e., $$dZ = (\partial Z/\partial Sx)dSx + (\partial Z/\partial Sy)dSy, \quad \text{Equation (2)}$$

optimal fitting is performed by regarding this dZ as the difference between the design equation of Equation (1) and the actual data. In other words, the fitting is performed by applying the initial values of the respective coefficients to the equation:

$$(\partial Z/\partial Sx)dSx + (\partial Z/\partial Sy)dSy$$
$$= \text{data} - [C00 + C02\{(X-Sx)^2 + (Y-Sy)^2\} + C04\{(X-Sx)^2 + (Y-Sy)^2\}^2], \quad \text{Equation (3)}$$

and accordingly (dSx, dSy) can be calculated.

When this method is applied to interference measurement data, errors in the reference surface 4 (Fizeau surface) itself may be superimposed on the rotationally averaged data. However, if the difference data of the interference measurement between before and after the lateral shift are used in combination with the operation of applying a known lateral shift vector quantity (Lx−Sx, Ly−Sy), this error in the reference surface 4 itself can be canceled. This way, it becomes possible to prepare data that include only the rotationally symmetric components of the surface profile of the object at each of the initial and terminal positions of the lateral movement.

Since the coordinate values are expressed by the address of pixels in the case of the CCD camera, until the conversion of "mm/pixel" is performed, the following equation is useful instead of Equation (1):

$$Z - \underline{Z}$$
$$= C00$$
$$+ C02[\{m(I-Si)\}^2 + \{m(J-Sj)\}^2]$$
$$+ C04[\{m(I-Si)\}^2 + \{m(J-Sj)\}^2]^2$$
$$- C02[\{m(I-Si-Li)\}^2 + \{m(J-Sj-Lj)\}^2]$$
$$- C04[\{m(I-Si-Li)\}^2 + \{m(J-Sj-Lj)\}^2]^2 \quad \text{Equation (4)}$$

This converts the (X, Y) coordinate expression on the object surface 1a into the (I, J) coordinate expression on the CCD. The coefficient m corresponds to the magnification of the optical system.

Among the coefficients in the above equation, m is a value to be determined, and as for the lateral shift vectors, only (mLi, mLj) are known quantities. Accordingly, the initial values of (Li, Lj) are given by tentatively regarding the magnification determined with reference to the diameter of the measured interference as m. Furthermore, it is assumed that the lateral shift of the axis of rotation be zero so that the axis of rotation and the origin of the coordinates coincide with each other.

In this case, the initial values (C0k, C2k, C4k) of (C00, C02, C04) are determined by applying least-squares fitting to lateral difference data representing the difference between before and after the lateral shift using the following equation:

$$\text{Sum} = \{\text{data} - (Z - \underline{Z})\}^2 \quad \text{Equation (5)}$$

Next, using Equation (2) with these initial values, the position (Sx, Sy) of the axis of rotation X can be calculated as the amount of shift (dSx, dSy) between the axis of rotation and the origin of operation. In practice, it has been confirmed by simulation that the accuracy can be greatly improved by applying the lateral shift operation to the origin of the calculation process in a distributive way, and adding and averaging the values of (dSx, dSy) thus obtained. Also, in the calculation of (dSx, dSy), (C0k, C2k, C4k) are regarded as fitting parameters, and the calculation of (dC0k, dC2k, dC4k) is performed using the following Equation (6) instead of Equation (2) at the same time:

$$d(Z-\underline{Z}) = \{\partial(Z-\underline{Z})/\partial C00\}dC00$$
$$+\{\partial(Z-\underline{Z})/\partial C02\}dC02$$
$$+\{\partial(Z-\underline{Z})/\partial C04\}dC04$$
$$+\{\partial(Z-\underline{Z})/\partial Sx\}dCSx$$
$$+\{\partial(Z-\underline{Z})/\partial sy\}dCSy. \qquad \text{Equation (6)}$$

Next, a method for determining the magnification m using thus determined (Sx, Sy) is described. First, in a similar manner to above, the initial values (C0k, C2k, C4k) of (C00, C02, C04) are determined by performing optimal fitting on the data representing the difference in interference data between before and after the lateral shift (lateral shift subtraction data) using Equation (5). Next, using these initial values, the deviation dm with respect to the initial value m can be calculated by applying the following equation:

$$dZ=(\partial Z/\partial m)dm \qquad \text{Equation (7)}$$

Similarly, in practice, it has been confirmed by simulation that the accuracy can be greatly improved by applying the lateral shift operation to the origin of the calculation process in a distributive way, and adding and averaging the values of dm thus obtained. Furthermore, in this calculation of dm, regarding (C0k, C2k, C4k) as fitting parameters, the calculation of (dC0k, dC2k, dC4K) can be performed using the following equation at the same time:

$$d(Z-\underline{Z}) = \{\partial(Z-\underline{Z})/\partial C00\}dC00$$
$$+\{\partial(Z-\underline{Z})/\partial C02\}dC02$$
$$+\{\partial(Z-\underline{Z})/\partial C04\}dC04$$
$$+\{\partial(Z-\underline{Z})/\partial m\}dm \qquad \text{Equation (8)}$$

Furthermore, it has been confirmed by simulation that (C00, C02, C04) can be calculated with high accuracy by applying optimal fitting to the lateral shift subtraction data in the forward and reverse directions by means of Equation (5) using the values of (dSx, dSy) and (m+dm) obtained in the operations described above.

Second Preferred Embodiment

Another method of recognizing and detecting an imaginary point on the object surface $1a$ will be described as a second preferred embodiment. For example, if the outline shape of the object surface $1a$ is circular, the center of the circle is generally used as a representative point of the object surface. In this embodiment, this center of the figure is used as the imaginary reference point.

Furthermore, it is not necessary that the shape of the object surface $1a$ be circular; it is sufficient if the outline shape of the object surface is known beforehand. If the outline shape is known, the imaginary point can be determined with reference to the outline shape. Furthermore, instead of the imaginary point with reference to the outline shape, the outline shape itself extracted by a characteristic extraction method can be adopted.

Third Preferred Embodiment

A method for normalizing the image pickup area using the magnification m of the interferometer thus obtained will be described as a third preferred embodiment. At the outline portion of the actual interference measurement data, as described above, errors are unavoidably included in the measured outer diameter of a circular object surface $1a$, for example, due to the insufficient brightness of the interference fringes and/or the improper gain of the interference fringe image pickup device 3 (e.g., CCD camera) of the interferometer. In such a case, the image pickup region that faithfully represents the actual profile can be obtained using the magnification m measured according to the present invention instead of calculating "mm/pixel" from the outer diameter.

For example, if a CCD camera 3 is used as the interference fringe image pickup device, and the object surface $1a$ has a circular shape with a radius r, the following relationship is satisfied.

$$r=m\{(g/\pi)^{1/2}-\tfrac{1}{2}\}, \qquad \text{Equation (9)}$$

where g is the number of CCD pixels that capture the image generated by the interferometer 20. In actuality, it is necessary to vary the coefficient "½" on the right side of this equation in accordance with the relationship between the area of the CCD used for data acquisition and the sampling interval of the CCD (aperture ratio). Equation (9) represents a ideal case where the aperture ratio is 100%. If the calculated value from the right side of Equation (9) is larger than the design value r of the left side due to the above-mentioned fluctuations, appropriate weighting factors are added to the CCD data for the corresponding peripheral portion.

The reason why this operation is useful is as follows. For example, if interference measurements are performed on a circular lens surface, dominant errors in the polished surface profile are rotationally symmetric error components. If large errors arise from edge drop or edge lift in the peripheral area as this rotationally symmetric error, considering the area ratio between the central area and the peripheral area, considerable errors may be generated in the surface accuracy measurements of the lens surface obtained by the process of the alignment error correction.

The above-mentioned weighting method can also be applied to the treatment of the peripheral area when discrete data are averaged. Specifically, the weighting method is effective when the data obtained through the interference fringe image pickup device 3 having the sampling number of 256×256 are converted into 128×128 pixels at the computation unit 30. Thus, data from every four (4) pixels are converted into a data corresponding to one pixel by arithmetic averaging. Using the weighting method, information in the peripheral area can be effectively utilized.

Fourth Preferred Embodiment

A fourth preferred embodiment is the case where equal-pitch sampling cannot be realized on the object surface $1a$ due to, for example, distortion of the optical system in the interferometer 20, which optically couples the interference fringe image pickup device 3 with the object surface $1a$, even though the interference fringe image pickup device 3 itself has a function that allows spatial equal-pitch sampling. This means that the image of the object surface $1a$ is distorted.

When such optical distortion occurs, it is necessary to determine the amount of the distortion with high accuracy.

Then, using the amount of distortion, the discrete data of the interference fringe image pickup device 3 can be corrected (interpolated) to equal-pitch data, and applied to the first through third preferred embodiments described above. The optical distortion value may be determined from optical design value or from measurement.

To obtain the distortion value through measurement, the following method is known. First, the object surface 1a, which is in a state of minimizing the number of interference fringes, is tilted by a small amount. Then, distortion is estimated from the resultant effects on the interference fringes. If this method is used, CCD data corresponding only to the effective light flux of the interferometer need to be processed. Accordingly, except when a strict treatment is required, the effect of the uncertainty on the outer diameter can be ignored.

If interference measurement data with a circular shape are subjected to rotationally symmetric optical distortion, Equation (9) is effective for calculating the approximate "mm/pixel" as long as the amount of the optical distortion is known.

Another kind of distortion is geometrical distortion which is caused by the lateral shift of non-flat object surface 1a (spherical surface, etc.). This can also be handled by separately determining the amount of the lateral shift and performing an appropriate coordinate transformation.

Fifth Preferred Embodiment

If the magnification calibration apparatuses of the first through fourth preferred embodiments described above are applied to a shape measuring system using an interferometer, the image pickup area on the object surface can be accurately determined. That is, the system can be designed such that the gain of the interference fringe image pickup device 3 is controlled in accordance with the relationship between the coordinates on the object surface and the coordinates on the interference fringe image pickup device 3, which is obtained above.

Furthermore, if the magnification calibration apparatus of the third preferred embodiment is applied to a shape measuring system using an interferometer, the outline shape of the object surface can be accurately specified. As a result, the accuracy in shape measurement with reference to the outline shape can be greatly reduced.

According to the present invention, the relationship between the coordinates on the object surface and the coordinates on the detector for detecting the image of the object surface can be accurately determined by comparing the amount of movement of the image of an imaginary reference point on the object surface in the coordinate system fixed to the detector with a predetermined distance by which the object surface is actually moved to cause the imaginary point movement. Accordingly, this correspondence between the two coordinate systems can be accurately calculated.

Furthermore, according to the present invention, the center of the object surface defined by rotation of the object surface through the rotating unit can be recognized as the imaginary reference point by performing rotational averaging on the data acquired at a plurality of rotated positions, which corresponds to extracting rotationally symmetric components of the object surface. Accordingly, the imaginary reference point can be accurately specified.

Moreover, according to the present invention, a point that is geometrically defined from the outline shape of the object surface detected by the detector can be recognized as the imaginary reference point. Accordingly, the imaginary reference point can be specified regardless of the specific shape of the object surface.

Moreover, according to the present invention, weighting coefficients may be added to the data corresponding to the peripheral portion of the image of the object surface (among the data obtained by the detector). Accordingly, the outline shape of the object surface can be accurately determined, and the imaginary reference point can also be accurately specified.

In the present invention, a correction for canceling lateral coordinate distortion can be applied to the data obtained by the detector. Accordingly, the effects of lateral coordinate distortion can be alleviated.

According to the shape measurement system of the present invention, the gain of an interference fringe image pickup device can be adjusted to an appropriate value by installing the magnification calibration apparatus described above.

According to the shape measurement system of the present invention, the system is equipped with the magnification calibration apparatus that can add the weighting coefficients to the data corresponding to the outline portion of the image of the object surface. Accordingly, the outline shape of the object surface can be accurately specified.

It will be apparent to those skilled in the art that various modifications and variations can be made in the magnification calibration apparatus and the shape measuring apparatus of the present invention without departing from the spirit or scope of the invention. Thus, it is intended that the present invention cover the modifications and variations of this invention provided they come within the scope of the appended claims and their equivalents.

What is claimed is:

1. A magnification calibration apparatus, comprising:
   an optical system optically coupled to an object surface for forming an image of the object surface;
   a detector for detecting the image of the object surface;
   a movable support for supporting the object surface, the movable support being configured to laterally move the object surface by a predetermined distance from a first lateral position to a second lateral position;
   a reference point recognition unit for, at each of the first and second lateral positions of the object surface, detecting the position of the image of an imaginary reference point on the object surface as a position in a detector coordinate system fixed to the detector in accordance with the image detected by the detector; and
   a computation unit for deriving a correspondence between an object coordinate system at the object surface and the detector coordinate system from the detected positions of the image in the detector coordinate system at the first and second lateral positions of the object surface and from the predetermined distance by which the object surface is moved from the first lateral position to the second lateral position by the movable support.

2. The magnification calibration apparatus according to claim 1, wherein the reference point recognition unit includes a rotating unit for rotating the object surface around a direction substantially parallel to an optical axis of the optical system to a plurality of predetermined rotated positions at each of the first and second lateral positions of the object surface,
   wherein the reference point recognition unit averages data representing the image of the object surface detected at the plurality of rotated positions to derive a rotationally symmetric component of the data at each of the first and second lateral positions of the object surface, and wherein the reference point recognition unit further processes the rotationally symmetric component of the data to derive a center of the rotationally symmetric component of the data and recognizes the center as the image of the imaginary reference point at each of the first and second lateral positions of the object surface.

3. The magnification calibration apparatus according to claim 1, wherein the reference point recognition unit includes a rotating unit for rotating the object surface around a direction substantially parallel to an optical axis of the optical system to a plurality of predetermined rotated positions at each of the first and second lateral positions of the object surface, wherein the detector has a data accumulation function and thereby effectively averages data representing the image of the object surface detected at the plurality of rotated positions to derive a rotationally symmetric component of the data at each of the first and second lateral positions of the object surface, and wherein the reference point recognition unit further processes the rotationally symmetric component of the data to derive a center of the rotationally symmetric component of the data and recognizes the center as the image of the imaginary reference point at each of the first and second lateral positions of the object surface.

4. The magnification calibration apparatus according to claim 1, wherein the reference point recognition unit recognizes a point that is geometrically defined from an outer shape of the object surface detected by the detector as the imaginary reference point at each of the first and second lateral positions of the object surface.

5. The magnification calibration apparatus according to claim 1, wherein the reference point recognition unit adds a weighing coefficient to data corresponding to an area adjacent an outer edge of the object surface in accordance with the derived correspondence between the object coordinate system and the detector coordinate system to derive an accurate shape of the outer edge of the object surface.

6. The magnification calibration apparatus according to claim 1, wherein when the image includes a lateral coordinate distortion caused by at least one of optical distortion of the optical system and geometrical distortion accompanying the movement of the object surface from the first lateral position to the second lateral position, the detector calibrates the image to cancel the lateral coordinate distortion.

7. The magnification calibration apparatus according to claim 1, wherein the detector samples the image of the object surface at a plurality of discrete coordinate positions.

8. A method of calibrating a projection ratio of an optical system projecting an image of an object surface onto an image plane, the method comprising the steps of:

positioning the object surface at a first predetermined position;

detecting a projected position of an imaginary reference point on the object surface positioned at the first predetermined position in an image coordinate system fixed to the image plane;

moving the object surface by a predetermined distance to a second predetermined position;

detecting a projected position of the imaginary reference point on the object surface positioned at the second predetermined position in the image coordinate system; and calibrating the projection ratio in accordance with the detected positions of the imaginary reference point at the first and second predetermined positions of the object surface and the predetermined distance by which the object surface is moved in the step of moving.

9. The method according to claim 8, wherein each detecting step includes the steps of:

rotating the object surface around an axis substantially perpendicularly intersecting the object surface at the imaginary reference point;

averaging the images projected by the optical system while the object surface is rotated in the step of rotating to derive a rotationally averaged image; and determining a position of a center of the rotationally averaged image in the image coordinate system to identify the position of the center as the position of the image of the imaginary reference point.

* * * * *